United States Patent
Kawato et al.

(10) Patent No.: US 12,486,912 B2
(45) Date of Patent: Dec. 2, 2025

(54) SWITCHING VALVE

(71) Applicant: EAGLE INDUSTRY CO., LTD., Tokyo (JP)

(72) Inventors: Tadanobu Kawato, Tokyo (JP); Takashi Shioi, Tokyo (JP); Akitaka Matsuzaki, Tokyo (JP); Naoki Nishimura, Tokyo (JP); Ryota Urakawa, Tokyo (JP); Hironori Tanikawa, Tokyo (JP); Noriyuki Ogawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/691,439

(22) PCT Filed: Sep. 14, 2022

(86) PCT No.: PCT/JP2022/034389
§ 371 (c)(1),
(2) Date: Mar. 12, 2024

(87) PCT Pub. No.: WO2023/048045
PCT Pub. Date: Mar. 30, 2023

(65) Prior Publication Data
US 2024/0401709 A1    Dec. 5, 2024

(30) Foreign Application Priority Data
Sep. 21, 2021    (JP) .................................. 2021-153198

(51) Int. Cl.
*F16K 11/074*    (2006.01)
(52) U.S. Cl.
CPC .................................. *F16K 11/074* (2013.01)

(58) Field of Classification Search
CPC ...................................................... F16K 11/074
(Continued)

(56) References Cited

U.S. PATENT DOCUMENTS

| 2,990,853 A | * | 7/1961 | Sharp | F15B 13/04 251/285 |
| 4,311,020 A | | 1/1982 | Tobin et al. | |

(Continued)

FOREIGN PATENT DOCUMENTS

| JP | H07260022 | 10/1995 | |
| JP | H1137332 | 2/1999 | ............. F16K 31/06 |

(Continued)

OTHER PUBLICATIONS

International Search Report and Written Opinion issued in PCT/JP2022/034389, dated Nov. 15, 2022, with English translation, 11 pages.

(Continued)

*Primary Examiner* — Angelisa L. Hicks
(74) *Attorney, Agent, or Firm* — HAYES SOLOWAY P.C.

(57) ABSTRACT

Provided is a switching valve capable of maintaining a satisfactory contact state between a contact surface of a rotor and a seat surface of a stator in a rotation range of the rotor. A stator is provided with a plurality of inlet ports and outlet ports through which a working fluid passes, a rotor is provided with at least two through-holes and communication grooves which are able to selectively communicate between the inlet ports and the outlet ports, a casing is provided with a fluid inlet opening which communicates with each of the through-holes, and at least one of the through-holes always communicates with any of the outlet ports of in a rotation range of the rotor.

6 Claims, 7 Drawing Sheets

(58) Field of Classification Search
USPC .............................................. 137/565.26, 597
See application file for complete search history.

(56) References Cited

U.S. PATENT DOCUMENTS

| | | | | |
|---|---|---|---|---|
| 4,633,904 | A * | 1/1987 | Schumann | ............ F16K 11/074 |
| | | | | 137/625.46 |
| 5,704,396 | A * | 1/1998 | Brillant | ................. F16K 11/074 |
| | | | | 137/625.46 |
| 6,012,488 | A * | 1/2000 | Nichols | ............... F16K 11/0743 |
| | | | | 137/625.11 |
| 2003/0098076 | A1* | 5/2003 | Nichols | ................. F16K 11/074 |
| | | | | 137/625.46 |
| 2006/0042686 | A1* | 3/2006 | Gamache | .............. F16K 11/074 |
| | | | | 137/51 |
| 2007/0028971 | A1* | 2/2007 | Wagner | ............. B01D 53/0446 |
| | | | | 137/625.15 |
| 2011/0198524 | A1* | 8/2011 | Wood | .................... F16K 11/074 |
| | | | | 251/304 |
| 2012/0180890 | A1 | 7/2012 | Kojima et al. | ........... 137/625.46 |

FOREIGN PATENT DOCUMENTS

| | | | | |
|---|---|---|---|---|
| JP | 2001235049 | | 8/2001 | ............. F16K 31/04 |
| JP | 200222041 | | 1/2002 | ............ F16K 11/074 |
| JP | 201194787 | | 5/2011 | ............ F16K 11/074 |
| JP | 2013-210050 | A2 | 10/2013 | |
| JP | 2014185662 | | 10/2014 | ............ F16K 11/074 |
| JP | 2022-103053 | A2 | 7/2022 | |

OTHER PUBLICATIONS

International Preliminary Report on Patentability issued in PCT/JP2022/034389, dated Mar. 26, 2024, 4 pages.

* cited by examiner

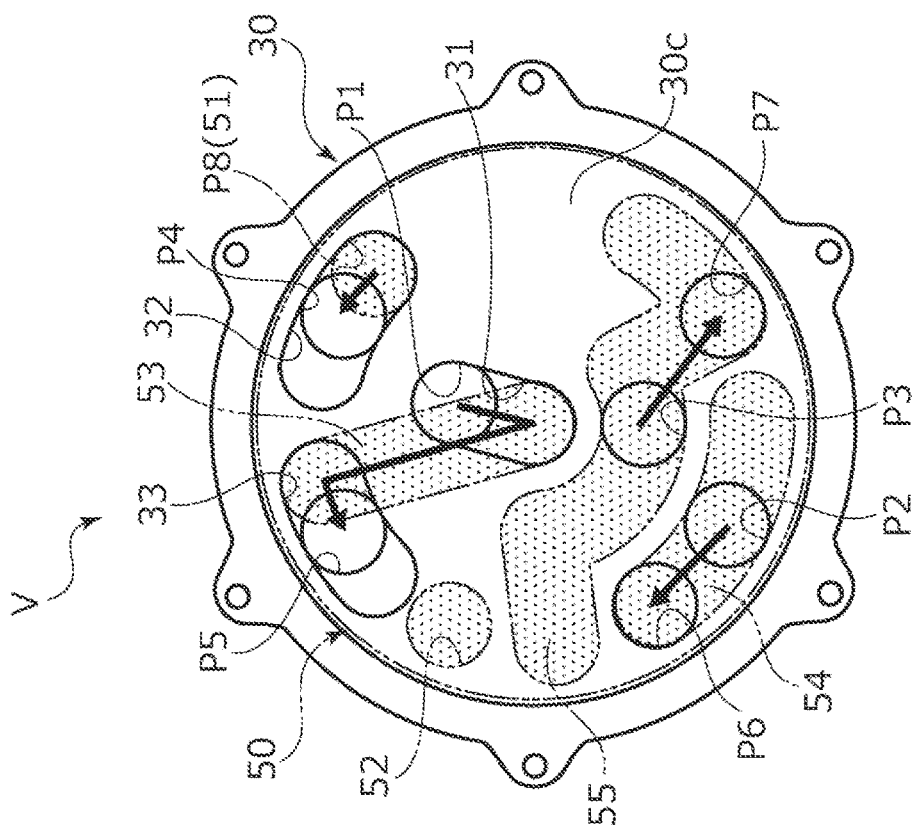
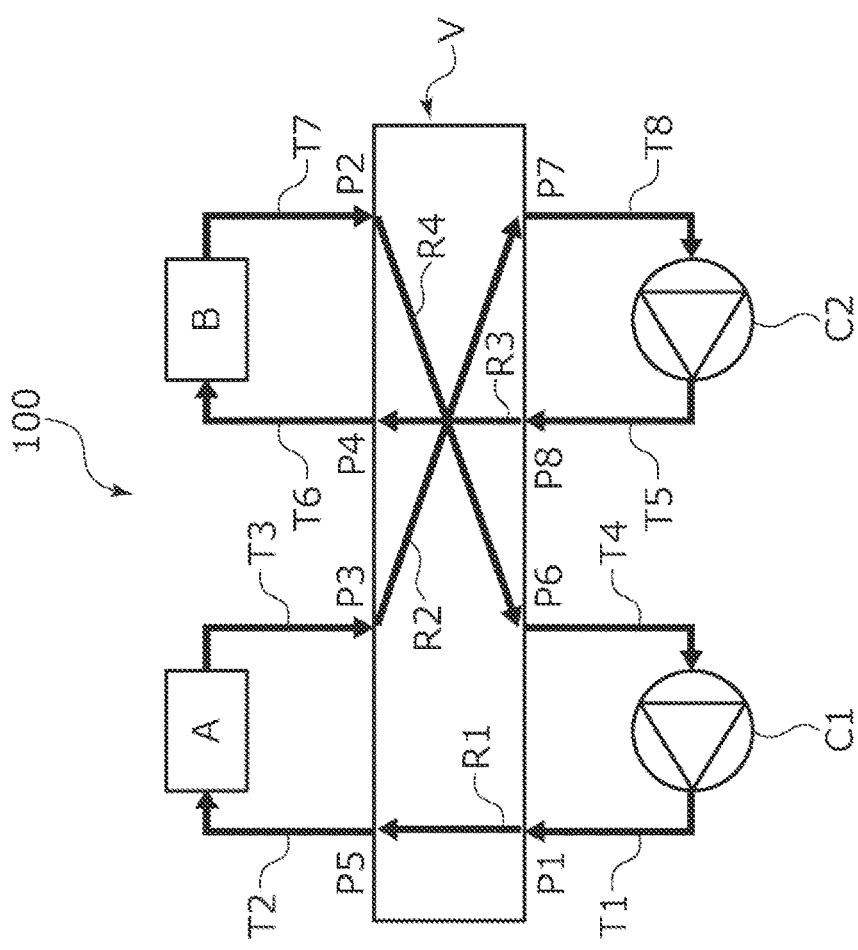
Fig. 5(a)
Fig. 5(b)

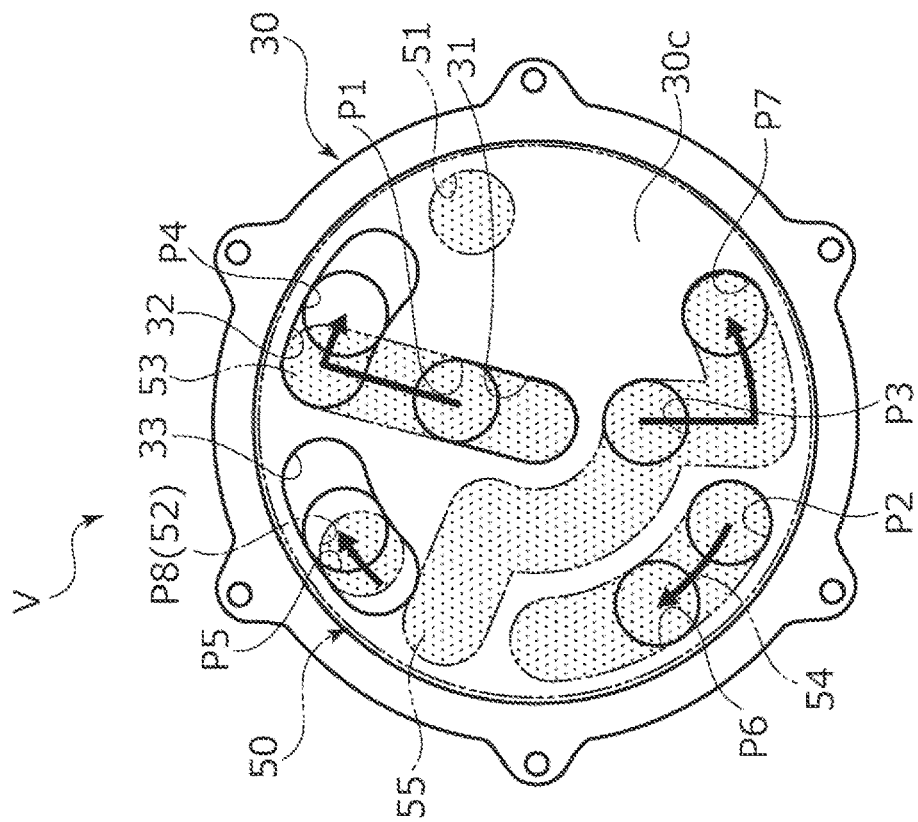
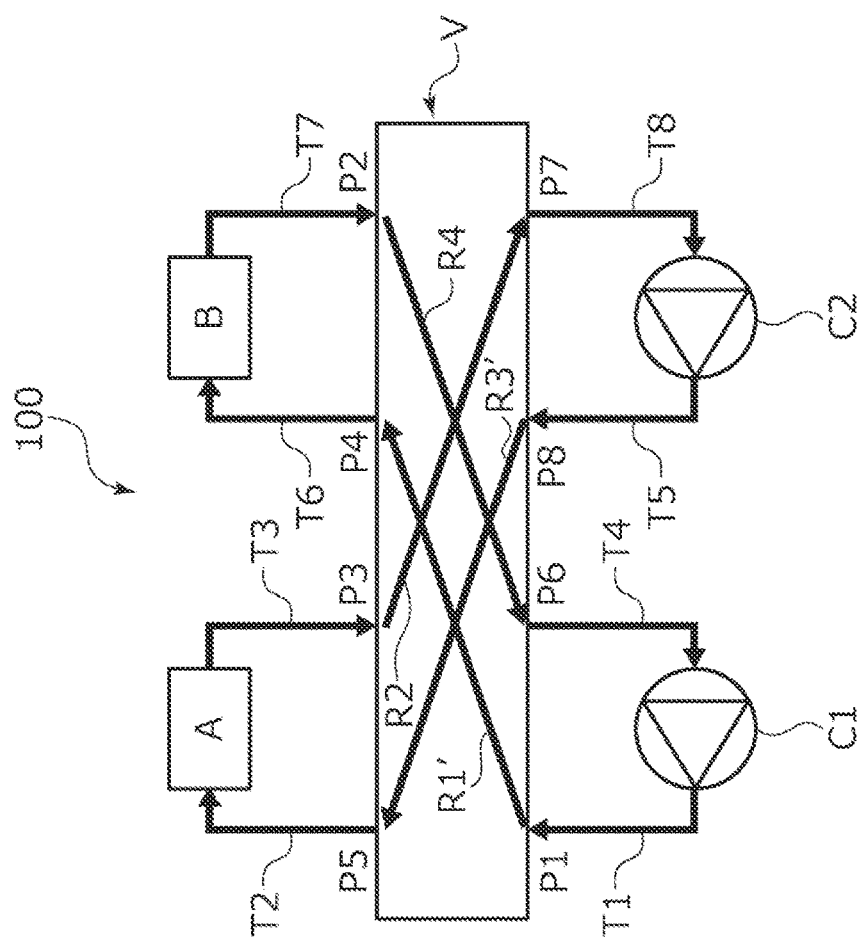
Fig. 7(a)
Fig. 7(b)

SWITCHING VALVE

TECHNICAL FIELD

The present invention relates to a switching valve, for example, a switching valve for switching flow paths through which a fluid flows.

BACKGROUND ART

In various industrial fields, a fluid circuit is used in which a fluid supply source and a fluid load such as a fluid actuator and a heat exchanger are connected by a flow path. In such a fluid circuit, there is known one that realizes a plurality of modes of operating the fluid load by one fluid circuit by providing a switching valve for switching a flow path of a working fluid.

For example, a switching valve of Patent Citation 1 mainly includes a stator having a seat surface, a casing hermetically attached to the stator, and a rotor disposed in a space formed between the stator and the casing. The rotor has a contact surface which comes into contact with the seat surface of the stator and is rotationally driven by a motor. Further, the stator is provided with an inlet port and an outlet port through which a working fluid passes.

The rotor is rotatable between a first rotation position, a second rotation position, and a third rotation position. At the first rotation position of the rotor, two ports are opened while not being closed by the rotor and two ports communicate with each other through a space formed between the stator and the casing. At the second rotation position of the rotor, one port is closed by the rotor, the other port is opened, and the communication between two ports is interrupted. At the third rotation position of the rotor, one port is opened, the other port is closed by the rotor, and the communication between two ports is interrupted. In this way, it is possible to switch the connection of each flow path through which the working fluid flows and to operate the fluid load in various modes by changing the first rotation position, the second rotation position, and the third rotation position of the rotor.

Further, the contact surface of the rotor is pressed against the seat surface of the stator by a force of a pressure of the working fluid introduced into the space formed between the stator and the casing and the contact state between the contact surface of the rotor and the seat surface of the stator can be maintained.

CITATION LIST

Patent Literature

Patent Citation 1: JP 2014-185662 A (Page 16, FIG. 3)

SUMMARY OF INVENTION

Technical Problem

In the switching valve of Patent Citation 1, since the flow of the working fluid between two ports is allowed at the first rotation position of the rotor, the pressure of the space in the casing is stabilized and the contact state between the contact surface of the rotor and the seat surface of the stator is maintained satisfactorily. However, since the flow of the working fluid between two ports is regulated at the second rotation position and the third rotation position of the rotor, the pressure of the space in the casing may increase or decrease. As a result, there is concern that the contact state between the contact surface of the rotor and the seat surface of the stator changes and the satisfactory contact state between the contact surface of the rotor and the seat surface of the stator cannot be maintained.

The present invention has been made in view of such problems and an object thereof is to provide a switching valve capable of maintaining a satisfactory contact state between a contact surface of a rotor and a seat surface of a stator in a rotation range of the rotor.

Solution to Problem

In order to solve the foregoing problem, a switching valve according to the present invention is a switching valve including: a stator that has a seat surface; a casing that is hermetically connected to the stator; and a rotor that has a contact surface coming into contact with the seat surface and is disposed between the stator and the casing, wherein the rotor is rotationally driven, with respect to the stator, between a first rotation position, a second rotation position rotating toward a first side from the first rotation position, and a third rotation position rotating toward a second side opposed to the first side from the first rotation position and forms different flow path patterns at the first rotation position, the second rotation position, and the third rotation position of the rotor, wherein the stator is provided with a plurality of inlet ports and outlet ports through which a working fluid passes, wherein the rotor is provided with at least two through-holes and a communication groove configured for selectively communicating between the inlet port and the outlet port, wherein the casing is provided with a fluid inlet opening that communicates with each of the through-holes, and wherein at least one of the through-holes always communicates with any of the outlet ports in a rotation range of the rotor. According to the aforesaid features of the present invention, since the working fluid introduced from the fluid inlet opening into the space in the casing acts to press the rotor toward the stator and flows from at least one through-hole to any outlet port at any position of the rotation range of the rotor, it is possible to suppress the variation amount of the force acting from the fluid in the axial direction of the rotor. Therefore, it is possible to maintain a satisfactory contact state between the contact surface of the rotor and the seat surface of the stator in the rotation range of the rotor.

It may be preferable that an opening area of the through-hole communicating with the outlet port is constant in the rotation range of the rotor. According to this preferable configuration, since the opening area of the through-hole with respect to the outlet port is substantially constant, the contact state between the contact surface of the rotor and the seat surface of the stator can be easily kept constant in the rotation range of the rotor.

It may be preferable that each inlet port always communicates with any of the outlet ports in the rotation range of the rotor. According to this preferable configuration, since the inlet port always communicates with any outlet port in the rotation range of the rotor, it is possible to form various flow path patterns at the first rotation position, the second rotation position, and the third rotation position of the rotor. Further, the rotor and the stator are compact.

It may be preferable that an opening area of each inlet port communicating with the outlet port is constant in the rotation range of the rotor. According to this preferable configuration, it is possible to suppress the pressure variation in each flow path in the rotation range of the rotor.

It may be preferable that the outlet port configured for communicating with the through-hole is provided in a first side area with respect to a virtual line passing through a center of the stator in the stator, and two sets or more of the outlet ports and the inlet ports are provided in a second side area opposed to the first side area with respect to the virtual line in the stator. According to this preferable configuration, it is possible to switch the communication state of the through-hole and the outlet port provided in the first side area and the communication state of two sets or more of the outlet ports and the inlet ports provided in the second side area in a short rotation stroke.

BRIEF DESCRIPTION OF DRAWINGS

FIG. 5A is a schematic view illustrating a first mode of a fluid circuit and FIG. 5B is a schematic view illustrating a first rotation position of the rotor.

FIG. 7A is a schematic view illustrating a third mode of the fluid circuit and FIG. 7B is a schematic view illustrating a third rotation position of the rotor.

DESCRIPTION OF EMBODIMENTS

A mode for carrying out a switching valve according to the present invention will be described on the basis of the embodiments.

Embodiment

A switching valve according to an embodiment of the present invention will be described with reference to FIGS. 1 to 7. Hereinafter, the upper and lower sides of FIG. 2 will be described as the upper and lower sides of the switching valve. Specifically, the upper side of the paper where the motor is disposed will be described as the upper side of the switching valve and the lower side of the paper which is the opposite side will be described as the lower side of the switching valve.

Figure 1:
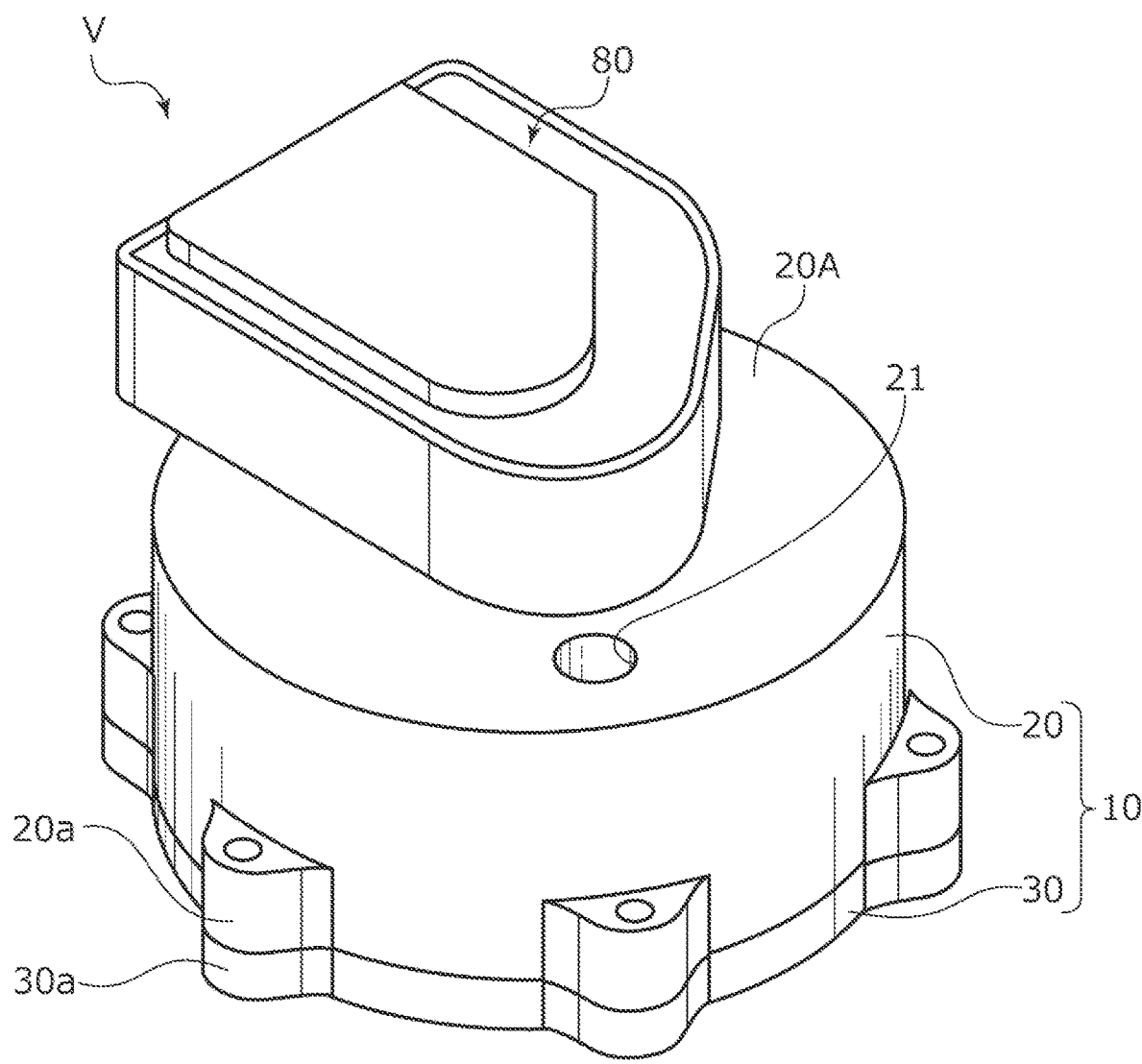
FIG. 1 is a perspective view of a switching valve according to an embodiment of the present invention.

As illustrated in FIG. 1, a switching valve V according to the embodiment of the present invention is used to select one of a plurality of modes for a fluid circuit and to switch a flow path through which a heat medium as a working fluid flows. The switching valve V of the embodiment is an electric motor type rotary valve.

Figure 2:
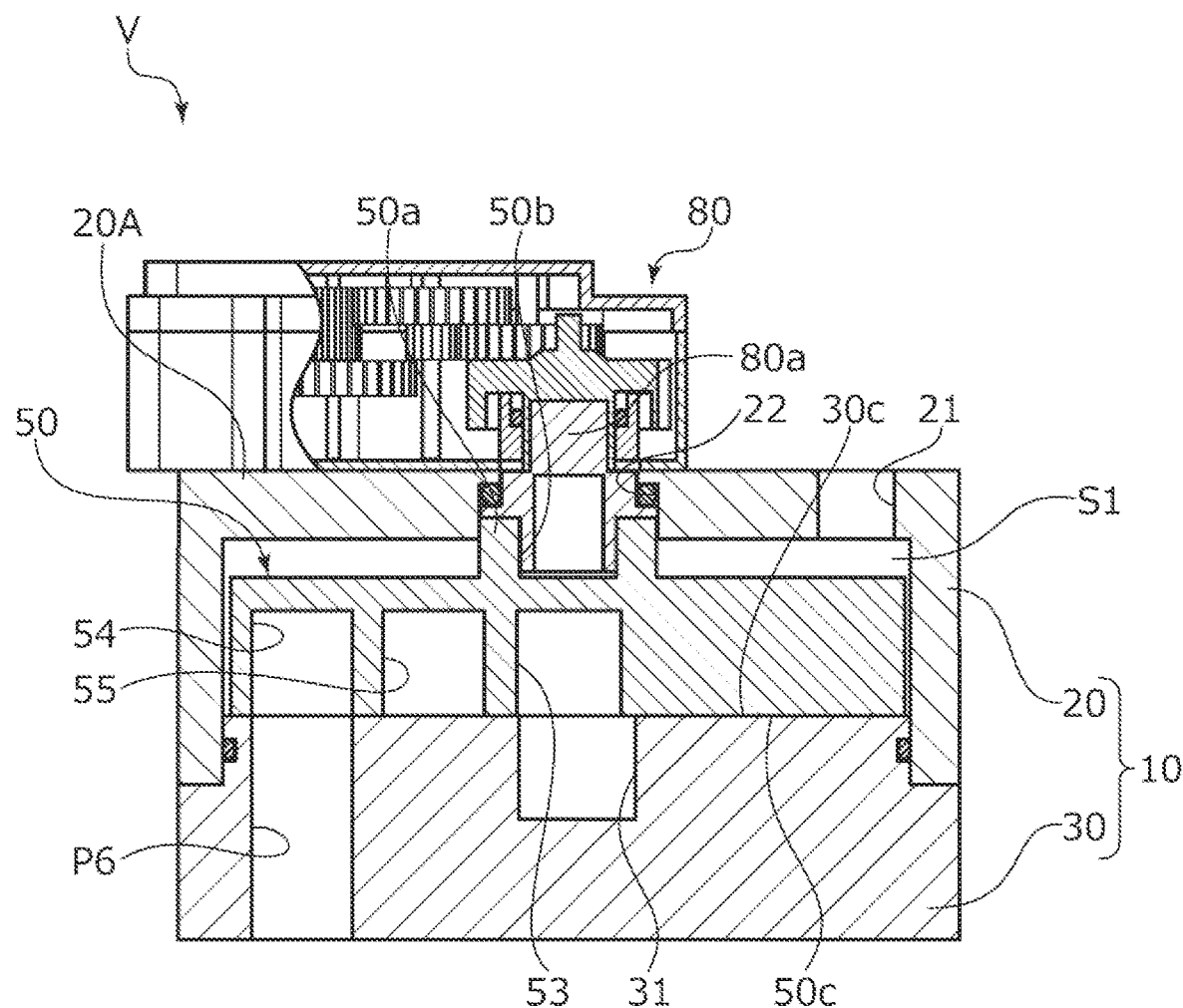
FIG. 2 is a side cross-sectional view of the switching valve.

As illustrated in FIGS. 1 and 2, the switching valve V mainly includes a housing 10, a rotor 50 (see FIG. 2), and a drive unit 80.

The housing 10 includes a bottomed cylindrical casing 20 and a columnar stator 30. The casing 20 and the stator 30 are made of a metal material or a resin material.

A plurality of flange portions 20a which protrude radially outward are provided at the lower end of the outer peripheral surface of the casing 20 at intervals in the circumferential direction. A plurality of flange portions 30a which protrude radially outward are provided on the outer peripheral surface of the stator 30 at intervals in the circumferential direction. The casing 20 and the stator 30 are connected by bolts (not illustrated) to the flange portions 20a and the flange portions 30a.

A communication hole 21 and an insertion hole 22 which penetrate in the up and down direction are provided in a bottom portion 20A of the casing 20. The communication hole 21 is provided at the outer radial position of the bottom portion 20A and communicates with a discharge side of a compressor C2 to be described later. That is, the communication hole 21 functions as the fluid inlet opening. The insertion hole 22 is provided at the center of the bottom portion 20A and a rotation shaft 80a is inserted thereinto as will be described later.

The rotor 50 is disposed inside the housing 10. In addition, the detailed shape of the rotor 50 will be described later.

The drive unit 80 is hermetically fixed to the housing 10 and drives the rotor 50 to rotate. Specifically, the drive unit 80 includes a plurality of gears, a rotation shaft 80a meshing with the gears, and a motor which drives them and is provided in a casing. The rotation shaft 80a extends in the up and down direction and the lower end portion thereof extends to a space S1 inside the housing 10 through the insertion hole 22 of the casing 20. The lower end portion of the rotation shaft 80a is fitted to a concave portion 50b of the rotor 50.

Figure 3A:
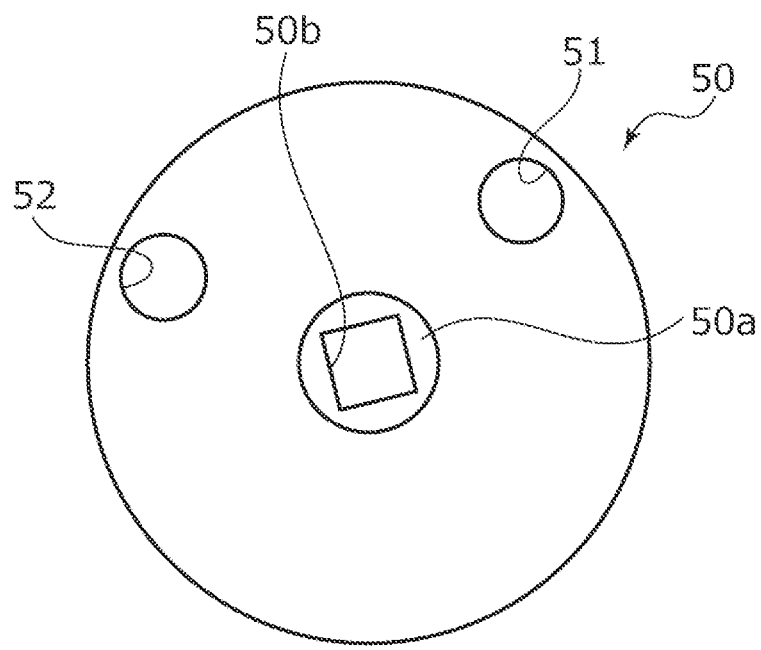
FIG. 3A is a top view of a rotor and FIG. 3B is a bottom view of the rotor.
Figure 3B:
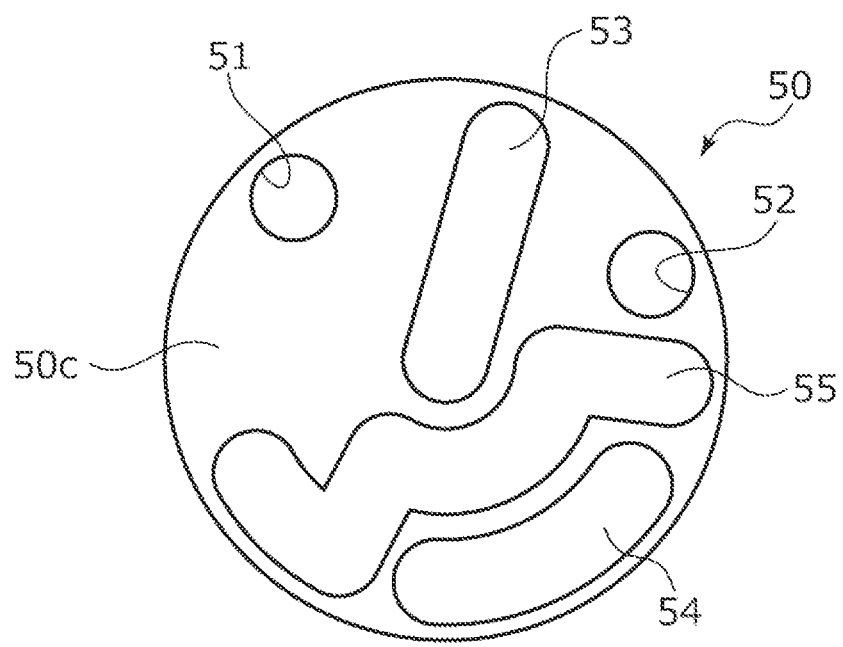

As illustrated in FIG. 3, the rotor 50 has a disk shape. A protrusion 50a which protrudes upward is formed at the center portion of the upper surface of the rotor 50. A concave portion 50b which opens upward is provided in the protrusion 50a. The concave portion 50b has a square shape when viewed from above and is fitted to the lower end portion of the rectangular rotation shaft 80a (see FIG. 2).

In addition, in this embodiment, the concave portion 50b is fitted to the lower end portion of the rotation shaft 80a so that both the rotation shaft 80a and the rotor 50 rotate, but the rotation shaft and the rotor may be integrally provided by welding or the like without providing the concave portion 50b.

Further, the rotor 50 is provided with one through-hole 51 and the other through-hole 52. The through-holes 51 and 52 are arranged on the outer radial side of the rotor 50. The through-hole 52 is provided at a position rotated counterclockwise by approximately 90 degrees from the through-hole 51 with the rotation center of the rotor 50 as a reference when viewed from above.

Further, a first communication groove 53, a second communication groove 54, and a third communication groove 55 are formed on a lower surface 50c of the rotor 50. The lower surface 50c of the rotor 50 is a contact surface which comes into contact with an upper surface 30c which is a seat surface of the stator 30 to be described later. Each of the communication grooves 53 to 55 is an elongated groove that opens downward and has a different shape.

A downward pressing force of the heat medium flowing from the compressor C2 to be described later into the space S1 through the communication hole 21 is largely applied to the rotor 50 compared to an upward pressing force of the heat medium flowing from inlet ports P1 to P3 to be described later. Accordingly, it is possible to maintain a state in which the lower surface 50c of the rotor 50 comes into contact with the upper surface 30c of the stator 30. In addition, it is preferable that the communication hole 21 is supplied with the heat medium having the highest pressure between the average pressures in use.

Figure 4:
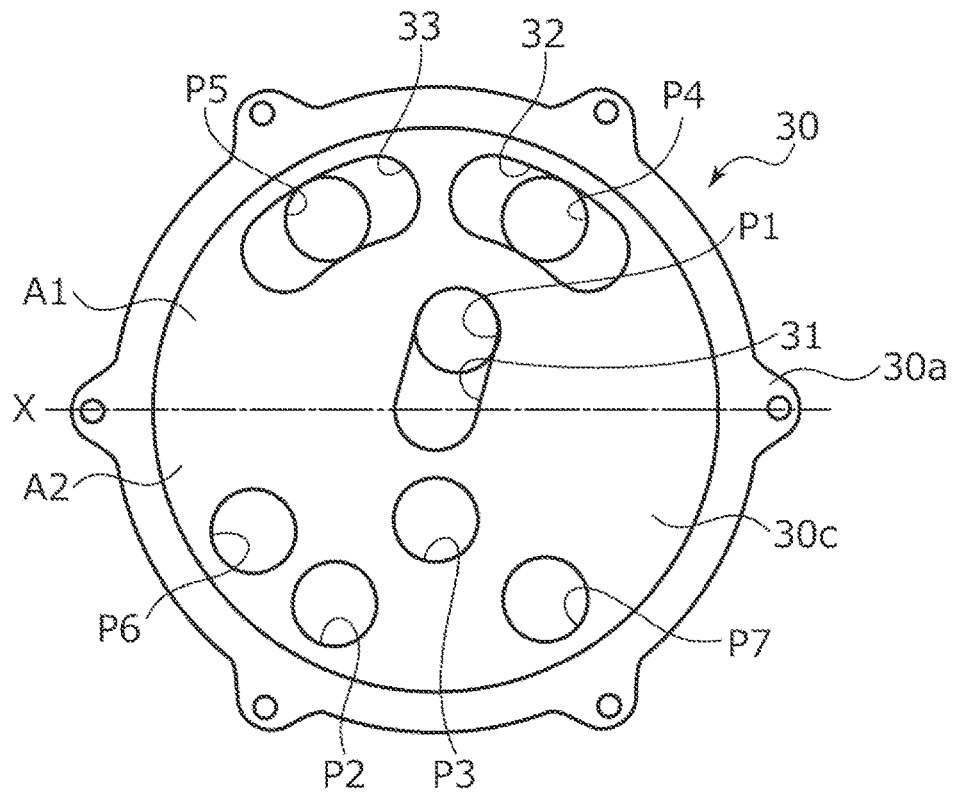
FIG. 4A is a top view of a stator and FIG. 4B is a bottom view of the stator.

As illustrated in FIG. 4, the stator 30 is provided with three inlet ports P1 to P3, four outlet ports P4 to P7, and the elongated grooves 31 to 33.

Figure 4B:
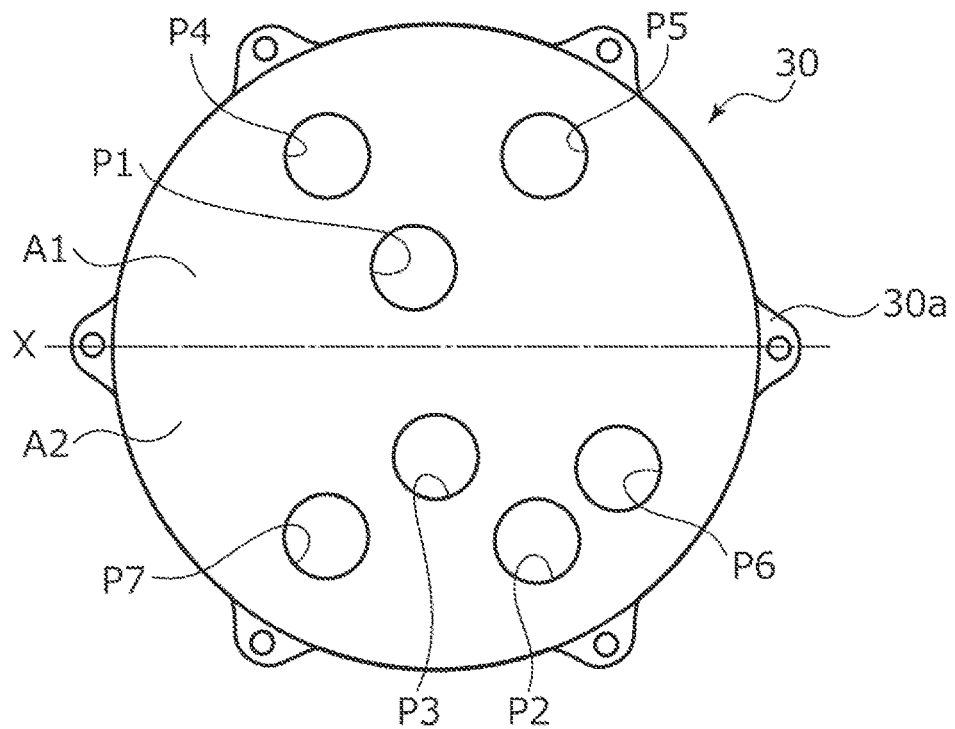

Specifically, the inlet port P1 and outlet ports P4 and P5 are provided in a first side area A1 (that is, the upper side of the paper of FIGS. 4A and 4B) of the stator 30 with respect to a virtual line X passing through the center of the stator 30. The inlet ports P2 and P3 and the outlet ports P6 and P7 are provided in a second side area A2 (that is, the lower side of the paper of FIGS. 4A and 4B) of the stator 30 with respect to the virtual line X passing through the center of the stator 30.

Further, the elongated grooves 31 to 33 are formed on the upper surface 30c of the stator 30 to open upward. The elongated groove 31 communicates with the inlet port P1. The elongated groove 32 communicates with the outlet port P4. The elongated groove 33 communicates with the outlet port P5. These elongated grooves 31 to 33 function to enlarge the opening areas of the inlet port P1 and the outlet ports P4 and P5 on the upper surface side.

Next, each mode of the fluid circuit 100 and a first rotation position, a second rotation position, and a third rotation position of the rotor 50 forming each mode will be described with reference to FIGS. 5 to 7. In addition, for convenience of description, the stator 30 is indicated by a solid line and the rotor 50 is indicated by a two-dotted chain line. In addition, the through-holes 51 and 52, the first communication groove 53, the second communication groove 54, and the third communication groove 55 of the rotor 50 are indicated by dots.

As illustrated in FIG. 5A, the fluid circuit 100 mainly includes two compressors C1 and C2, two loads A and B, eight fluid pipes T1 to T8, and the switching valve V. The pressure of the heat medium supplied from the compressor C2 is higher than the pressure of the heat medium supplied from the compressor C1. In this way, since the compressor C2 supplies the heat medium having a pressure higher than that of the compressor C1 to the communication hole 21, the lower surface 50c of the rotor 50 can be brought into contact with the upper surface 30c of the stator 30.

The fluid pipe T1 communicates between the compressor C1 and the inlet port P1. The fluid pipe T2 communicates between the outlet port P5 and the load A. The fluid pipe T3 communicates between the load A and the inlet port P3. The fluid pipe T4 communicates between the outlet port P6 and the compressor C1. The fluid pipe T5 communicates between the compressor C2 and the inlet port P8. The fluid pipe T6 communicates between the outlet port P4 and the load B. The fluid pipe T7 communicates between the load B and the inlet port P2. The fluid pipe T8 communicates between the outlet port P7 and the compressor C2.

In a first mode of the fluid circuit 100, the switching valve V forms a first flow path pattern in which a flow path R1 extending from the inlet port P1 communicates with the outlet port P5, a flow path R2 extending from the inlet port P3 communicates with the outlet port P7, a flow path R3 extending from the inlet port P8 communicates with the outlet port P4, and a flow path R4 extending from the inlet port P2 communicates with the outlet port P6.

FIG. 5B illustrates a first rotation position of the rotor 50 forming the first flow path pattern of the switching valve V. At the first rotation position of the rotor 50, the through-hole 51 communicates with the outlet port P4, the inlet port P1 communicates with the outlet port P5, the inlet port P2 communicates with the outlet port P6, and the inlet port P3 communicates with the outlet port P7.

Specifically, the through-hole 51 communicates with the outlet port P4 through the elongated groove 32. Since the through-hole 51 communicates with the space S1, the heat medium in the space S1 flows to the outlet port P4 through the through-hole 51 (see FIGS. 2 and 3). That is, the through-hole 51 functions as the inlet port P8 at the first rotation position of the rotor 50. Further, the elongated groove 32 substantially constitutes the flow path R3. In addition, the through-hole 52 is closed by the upper surface 30c of the stator 30 and does not communicate with the outlet ports P4 to P7.

The inlet port P1 communicates with the outlet port P5 through the elongated groove 31, the first communication groove 53, and the elongated groove 33. In other words, the elongated groove 31, the first communication groove 53, and the elongated groove 33 substantially constitute the flow path R1.

The inlet port P2 communicates with the outlet port P6 through the second communication groove 54. In other words, the second communication groove 54 substantially constitutes the flow path R4.

The inlet port P3 communicates with the outlet port P7 through the third communication groove 55. In other words, the third communication groove 55 substantially constitutes the flow path R2.

Figure 6B:
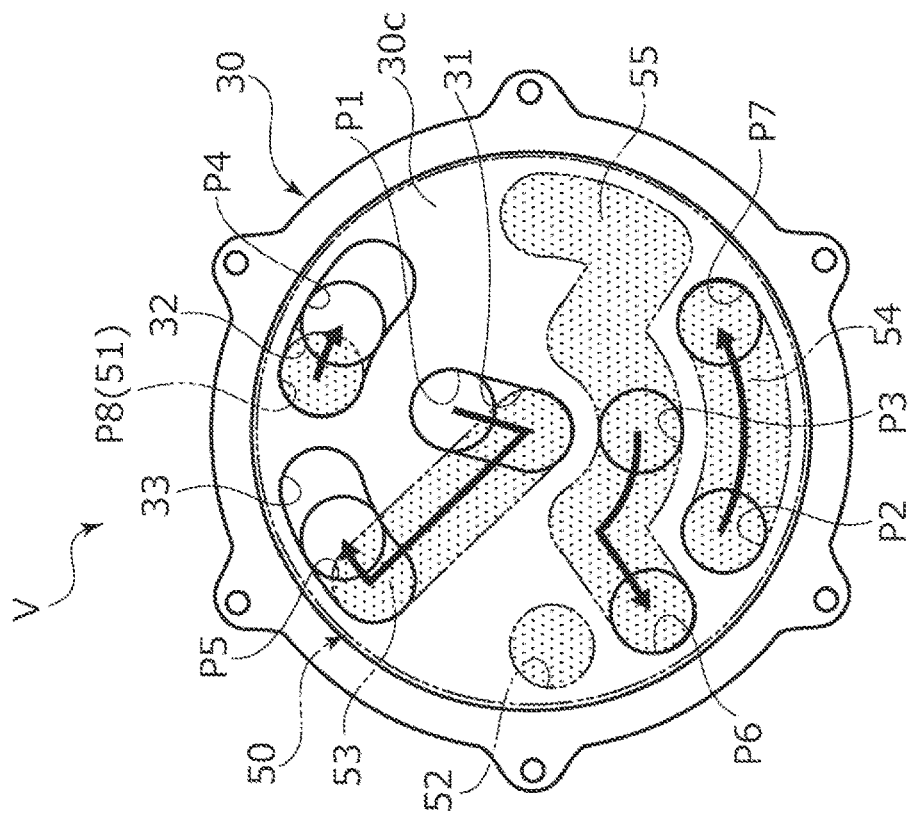
FIG. 6A is a schematic view illustrating a second mode of the fluid circuit and FIG. 6B is a schematic view illustrating a second rotation position of the rotor.
Figure 6A:
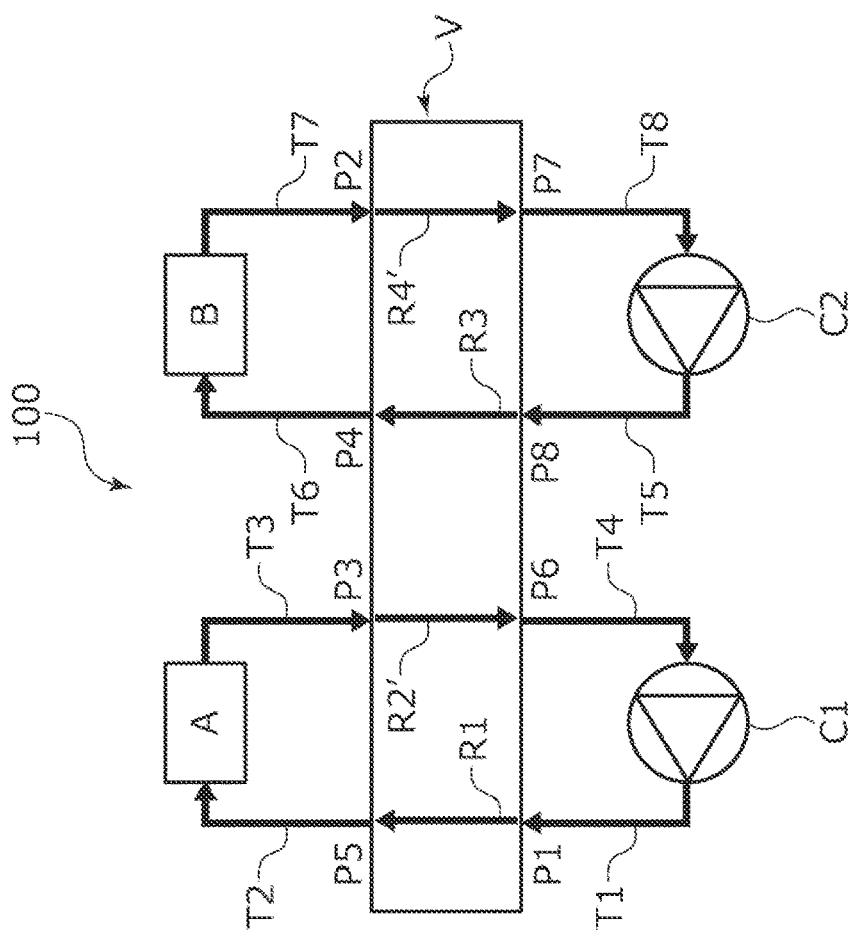

As illustrated in FIG. 6A, in a second mode of the fluid circuit 100, the switching valve V forms a second flow path pattern in which the flow path R1 extending from the inlet port P1 communicates with the outlet port P5, a flow path R2' extending from the inlet port P3 communicates with the outlet port P6, the flow path R3 extending from the inlet port P8 communicates with the outlet port P4, and a flow path R4' extending from the inlet port P2 communicates with the outlet port P7. That is, in the second flow path pattern of the switching valve V, only the connection destinations of the flow paths R2' and R4' are switched from the first flow path pattern.

FIG. 6B illustrates a second rotation position of the rotor 50 forming the second flow path pattern of the switching valve V. The second rotation position of the rotor 50 is a position where the rotor 50 is rotated approximately 30 degrees counterclockwise from the first rotation position as viewed from above.

The through-hole 51 communicates with the outlet port P4 through the elongated groove 32. In other words, the elongated groove 32 substantially constitutes the flow path R3 and the through-hole 51 functions as the inlet port P8. Additionally, the through-hole 52 is closed by the upper surface 30c of the stator 30.

Further, the inlet port P1 communicates with the outlet port P5 through the elongated groove 31, the first communication groove 53, and the elongated groove 33. In other words, the elongated groove 31, the first communication groove 53, and the elongated groove 33 substantially constitute the flow path R1.

The inlet port P2 communicates with the outlet port P7 through the second communication groove 54. In other words, the second communication groove 54 substantially constitutes the flow path R4'.

Further, the inlet port P3 communicates with the outlet port P6 through the third communication groove 55. In other words, the third communication groove 55 substantially constitutes the flow path R2'.

Further, the entire opening area of the through-hole 51 always communicates with the outlet port P4 in the rotation range from the first rotation position to the second rotation position of the rotor 50. Further, the entire opening area of the inlet port P1 always communicates with the outlet port P5 in the rotation range from the first rotation position to the second rotation position of the rotor 50.

In the outlet port P6, the opening area communicating with the second communication groove 54 (that is, the inlet port P2) gradually decreases in the rotation range from the first rotation position to the second rotation position of the rotor 50 and the opening area gradually increases when the outlet port P6 communicates with the third communication groove 55 (that is, the inlet port P3). Then, when the rotor 50 reaches the second rotation position, the entire opening area of the outlet port P6 communicates with the inlet port P3.

In the outlet port P7, the opening area communicating with the third communication groove 55 (that is, the inlet port P3) gradually decreases in the rotation range from the first rotation position to the second rotation position of the rotor 50 and the opening area gradually increases when the outlet port P7 communicates with the second communication groove 54 (that is, the inlet port P2). Then, when the rotor 50 reaches the second rotation position, the entire opening area of the outlet port P7 communicates with the inlet port P2.

There is a section in which the inlet ports P2 and P3 simultaneously communicate with the outlet ports P6 and P7 in the rotation range from the first rotation position to the second rotation position of the rotor 50. That is, at least any of the inlet ports P2 and P3 communicate with the outlet ports P6 and P7 in the rotation range from the first rotation position to the second rotation position of the rotor 50, respectively.

Further, the opening area of the inlet ports P2 and P3 communicating with the outlet port P6 and the opening area of the inlet ports P2 and P3 communicating with the outlet port P7 are substantially constant in the rotation range from the first rotation position to the second rotation position of the rotor 50. Additionally, in the present specification, the term "substantially constant" means that the opening area is allowed to vary within a range of ±20%.

As illustrated in FIG. 7A, in a third mode of the fluid circuit 100, the switching valve V forms a third flow path pattern in which a flow path R1' extending from the inlet port P1 communicates with the outlet port P4, the flow path R2 extending from the inlet port P3 communicates with the outlet port P7, a flow path R3' extending from the inlet port P8 communicates with the outlet port P5, and the flow path R4 extending from the inlet port P2 communicates with the outlet port P6. That is, in the third flow path pattern of the switching valve V, only the connection destinations of the flow paths R1' and R3' are switched from the first flow path pattern.

FIG. 7B illustrates a third rotation position of the rotor 50 forming the third flow path pattern of the switching valve V. The third rotation position of the rotor 50 is a position where the rotor 50 is rotated approximately 30 degrees clockwise from the first rotation position as viewed from above.

The inlet port P1 communicates with the outlet port P4 through the elongated groove 31, the first communication groove 53, and the elongated groove 32. In other words, the elongated groove 31, the first communication groove 53, and the elongated groove 32 substantially constitute the flow path R1'.

The through-hole 52 communicates with the outlet port P5 through the elongated groove 33. That is, the through-hole 52 functions as the inlet port P8 at a third rotation position of the rotor 50. In other words, the elongated groove 33 substantially constitutes the flow path R3'.

The inlet port P2 communicates with the outlet port P6 through the second communication groove 54. In other words, the second communication groove 54 substantially constitutes the flow path R4.

The inlet port P3 communicates with the outlet port P7 through the third communication groove 55. In other words, the third communication groove 55 substantially constitutes the flow path R2.

Specifically, in the through-hole 51, the opening area communicating with the outlet port P4 gradually decreases in the rotation range from the first rotation position to the third rotation position of the rotor 50 and the through-hole 51 does not communicate with any one of the ports when the rotor reaches the third rotation position.

Further, in the inlet port P1, the opening area communicating with the outlet port P5 gradually decreases in the rotation range from the first rotation position to the third rotation position of the rotor 50 and the opening area gradually increases when the inlet port P1 communicates with the outlet port P4. Then, when the rotor 50 reaches the third rotation position, the entire opening area of the inlet port P1 communicates with the outlet port P4.

Further, in the through-hole 52, the opening area communicating with the outlet port P5 gradually increases from a non-communication state with any port in the rotation range from the first rotation position to the third rotation position of the rotor 50 and the entire opening area of the through-hole 52 communicates with the outlet port P5 at the third rotation position.

There are a section in which the through-hole 51 and the inlet port P1 simultaneously communicate with the outlet port P4 and a section in which the through-hole 52 and the inlet port P1 simultaneously communicate with the outlet port P5 in the rotation range from the first rotation position to the third rotation position of the rotor 50. That is, at least any of the inlet port P1 and the through-holes 51 and 52 (that is, the inlet port P8) communicate with the outlet ports P4 and P5 in the rotation range from the first rotation position to the third rotation position of the rotor 50, respectively.

Further, the opening area of the inlet ports P1 and P8 communicating with the outlet port P4 and the opening area of the inlet ports P1 and P8 communicating with the outlet port P5 are substantially constant in the rotation range from the first rotation position to the third rotation position of the rotor 50.

As described above, since at least one of the through-holes 51 and 52 always communicates with at least one of the outlet ports P4 and P5 in the rotation range of the first rotation position, the second rotation position, and the third rotation position of the rotor 50, the heat medium introduced from the communication hole 21 into the space S1 in the casing 20 flows to at least one of the outlet ports P4 and P5 even at any position of the rotation range of the rotor 50. Then, the rotor 50 receives the fluid pressure from both axial sides during the rotation of the rotor 50 and the variation amount of the force acting to press the rotor 50 toward the stator 30 according to this pressure difference can be suppressed within a small range. Further, the flow path connecting the space S1 and the outlet ports P4 and P5 is not interrupted and the fluid pressure in the space S1 does not suddenly increases during the rotation of the rotor 50. In this way, a satisfactory contact state between the lower surface 50c of the rotor 50 and the upper surface 30c of the stator 30 can be kept in the rotation range of the rotor 50.

Further, since the opening area of the through-holes 51 and 52 communicating with the outlet ports P4 and P5 is substantially constant in the rotation range of the rotor 50, the contact state between the lower surface 50c of the rotor 50 and the upper surface 30c of the stator 30 can be easily kept constant in the rotation range of the rotor 50.

Further, the inlet ports P1 to P3 always respectively communicate with any one of the outlet ports P4 to P7 in the rotation range of the rotor 50. Accordingly, the inlet ports P1 to P3 always communicate with any one of the outlet ports P4 to P7 in the rotation range of the rotor 50. In other words, since all of the inlet ports P1 to P3 and the outlet ports P4 to P7 are used, various flow path patterns can be formed at the first rotation position, the second rotation position, and the third rotation position of the rotor 50. Further, the rotor 50 and the stator 30 are made compact.

Further, since the opening area in which the inlet ports P1 to P3 communicate with the outlet ports P4 to P7 is substantially constant in the rotation range of the rotor 50, it is possible to suppress the pressure variation in each of the flow paths R1 to R4 in the rotation range of the rotor 50.

Further, the outlet ports P4 and P5 which can communicate with the through-holes 51 and 52 and the inlet port P1 which can communicate with the outlet port P4 or the outlet port P5 are provided in the first side area A1 that sandwiches the virtual line X passing through the center of the stator 30 in the stator 30. Two sets of the outlet ports P6 and P7 and the inlet ports P2 and P3 are provided in the second side area A2 that sandwiches the virtual line X in the stator 30. Accordingly, it is possible to switch the communication state of the through-holes 51 and 52, the inlet port P1, and the outlet ports P4 and P5 provided in the first side area A1 and to switch the communication state of two sets of the outlet ports P6 and P7 and the inlet ports P2 and P3 provided in the second side area A2 in a short rotation stroke.

Although the embodiments of the present invention have been described above with reference to the drawings, the specific configuration is not limited to these examples, and any changes or additions that do not depart from the scope of the present invention are included in the present invention.

For example, in the above-described embodiment, although it has been exemplified that there are three modes of the fluid circuit, three flow path patterns of the switching valve, and three rotation positions of the rotor, four or more modes, flow path patterns, and rotation positions may be provided.

Further, in the above-described embodiment, although it has been exemplified that the switching valve is an eight-way switching valve having eight substantially functioning ports, the present invention is not limited thereto and the number of the connected external flow paths may be changed as appropriate.

Further, in the above-described embodiment, although it has been exemplified that the working fluid is the heat medium and the fluid supply source is the compressor, the present invention is not limited thereto. That is, the working fluid may be a fluid other than the heat medium and the fluid supply source may be a pump or the like.

Further, in the above-described embodiment, although it has been exemplified that the rotor is formed in a disk shape, the present invention is not limited thereto and the rotor may be formed in a C-shape, a fan shape, or the like. That is, the shape may be appropriately changed.

Further, in the above-described embodiment, although it has been exemplified that the rotor is pressed toward the stator by the working fluid of the space in the housing so that the contact state between the contact surface of the rotor and the seat surface of the stator can be maintained, in addition to this, the rotor may be pressed toward the stator by a coil spring or the like.

Further, in the above-described embodiment, although it has been exemplified that the rotor is rotated by the motor, the present invention is not limited thereto and the rotor may be manually rotated or may be rotated by an appropriate drive source other than the motor.

Further, in the above-described embodiment, although it has been exemplified that two through-holes are provided in the rotor, the present invention is not limited thereto and three or more through-holes may be provided.

REFERENCE SIGNS LIST

10 Housing
20 Casing
21 Communication hole (fluid inlet opening)
30 Stator
30c Upper surface (seat surface)
31 to 33 Elongated groove
50 Rotor
50c Lower surface (contact surface)
51, 52 Through-hole
53 to 55 Communication groove
80 Drive unit
100 Fluid circuit
A, B Load
A1 First side area
A2 Second side area
C1, C2 Compressor
P1 to P3, P8 Inlet port
P4 to P7 Outlet port
R1 to R4 Flow path
S1 Space
T1 to T8 Fluid pipe
V Switching valve

The invention claimed is:

1. A switching valve, comprising:
a stator that has a seat surface;
a casing that is hermetically connected to the stator; and
a rotor that has a contact surface coming into contact with the seat surface and is disposed in a space formed between the stator and the casing,
wherein the rotor is rotationally driven, with respect to the stator, between a first rotation position, a second rotation position rotating toward a first side from the first rotation position, and a third rotation position rotating toward a second side opposed to the first side from the first rotation position and forms different flow path patterns at the first rotation position, the second rotation position, and the third rotation position of the rotor,
wherein the stator is provided with a plurality of inlet ports and outlet ports through which a working fluid passes,
wherein the rotor is provided with at least two through-holes and a communication groove configured for selectively communicating between the inlet port and the outlet port,
wherein the casing is provided with a fluid inlet opening configured to communicate with each of the through-holes via the space, and
wherein at least one of the through-holes always communicates with any of the outlet ports in a rotation range of the rotor.

2. The switching valve according to claim 1,
wherein an opening area of the through-hole communicating with the outlet port is constant in the rotation range of the rotor.

3. The switching valve according to claim 2,
wherein each inlet port always communicates with any of the outlet ports in the rotation range of the rotor.

4. The switching valve according to claim 1,
wherein each inlet port always communicates with any of the outlet ports in the rotation range of the rotor.

5. The switching valve according to claim 4,
wherein an opening area of each inlet port communicating with the outlet port is constant in the rotation range of the rotor.

6. The switching valve according to claim 4,
wherein the outlet port configured for communicating with the through-hole is provided in a first side area with respect to a virtual line passing through a center of the stator in the stator, and
wherein two sets or more of the outlet ports and the inlet ports are provided in a second side area opposed to the first side area with respect to the virtual line in the stator.

* * * * *